United States Patent [19]

Nichols et al.

[11] 3,744,571

[45] July 10, 1973

[54] VINE TURNER

[76] Inventors: John J. Nichols, 2325 N.W. 17th St., Oklahoma City, Okla. 73107; Arvel L. Cowell, Rt. 1, Box 98-A, Morrilton, Ark. 72110

[22] Filed: Sept. 3, 1970

[21] Appl. No.: 69,318

[52] U.S. Cl............... 172/517, 172/276, 172/484
[51] Int. Cl............................................. A01b 35/32
[58] Field of Search.................... 172/27, 29, 508, 172/516, 517, 514, 515

[56] References Cited
UNITED STATES PATENTS

| | | | |
|---|---|---|---|
| 2,466,555 | 4/1949 | Paine et al. | 172/517 X |
| 2,187,833 | 1/1940 | Lock et al. | 172/517 X |
| 2,305,254 | 12/1942 | Hirschkorn | 172/517 X |
| 1,789,563 | 1/1931 | Quinan | 172/517 X |
| 1,747,291 | 2/1930 | Edwards | 172/27 |
| 2,664,806 | 1/1954 | McCready | 172/517 |
| 2,064,480 | 12/1936 | Lock et al. | 172/517 X |
| 981,728 | 1/1911 | Whiteman et al. | 172/29 |

*Primary Examiner*—Robert E. Pulfrey
*Assistant Examiner*—R. T. Rader
*Attorney*—Clarence A. O'Brien and Harvey B. Jacobson

[57] ABSTRACT

An implement to be mounted forward of a farm vehicle and including structural members that are vertically adjustable. Vine deflecting members are slidably mounted to the structural members to allow lateral adjustment of the deflecting members relative to the wheels of the vehicle. The deflecting members lift encountered vines and then push them laterally away from the path of the vehicle to permit its free passage.

1 Claim, 4 Drawing Figures

PATENTED JUL 10 1973

John J. Nichols
Arvel L. Cowell
INVENTORS

BY *Clarence A. O'Brien*
*and Harvey B. Jacobson*
Attorneys

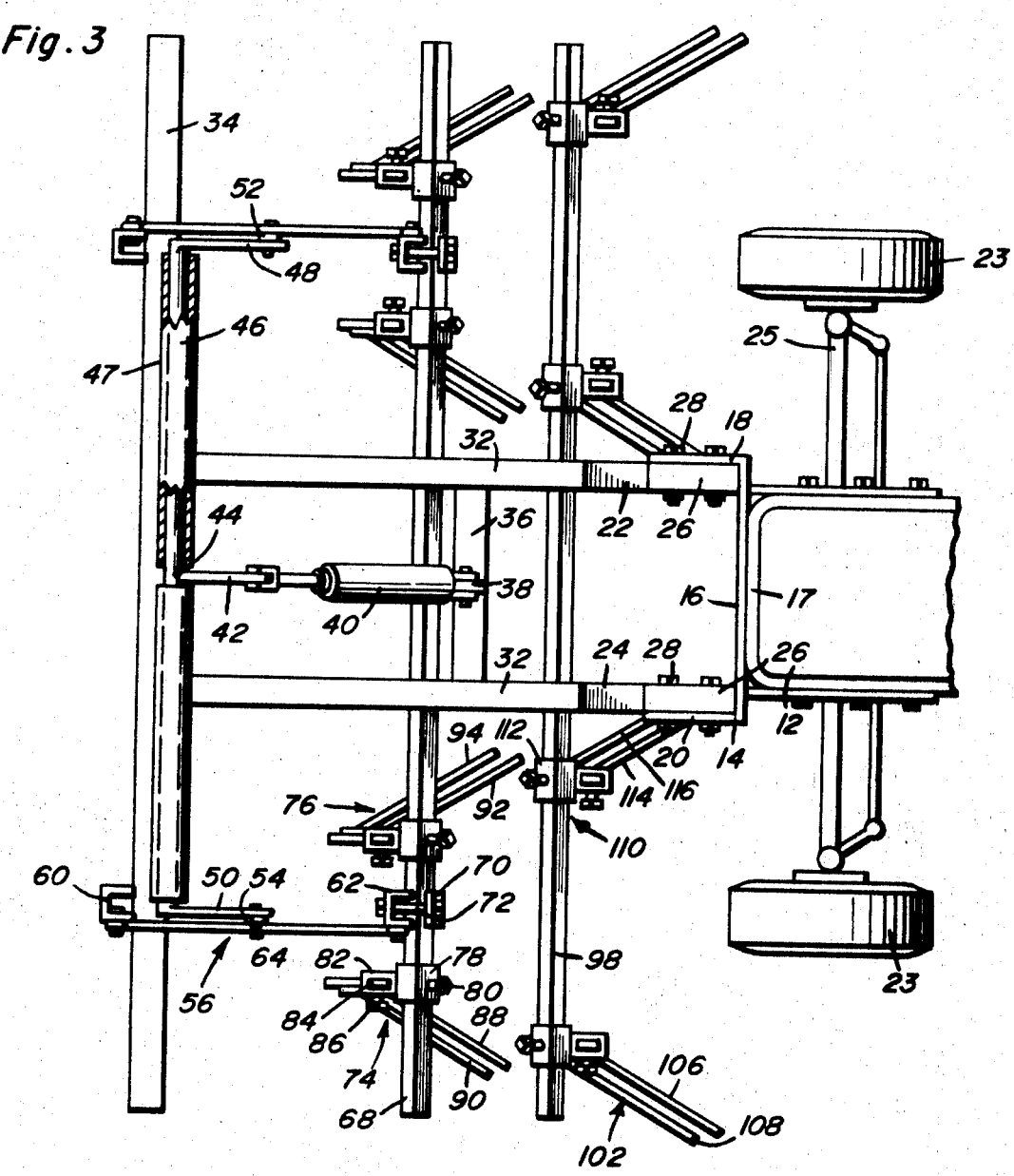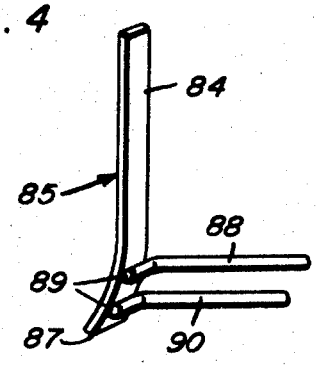

VINE TURNER

During the present time, several implements mounted forwardly of a farm vehicle are available for parting or dividing vines that block free passage of the vehicle down a field row. Generally, the available devices are angled downwardly from a vertically adjustable frame member. In essence, the device acts as a "cow catcher" secured to the forward end of old-fashioned locomotives. While reasonable success with certain crop vines has been achieved, known implements do not operate satisfactorily when it is desired to deflect tender vines for as much as 18 or 20 inches without damaging the vines.

The present invention is directed to a vine deflecting implement which has deflecting members both vertically and laterally adjustable. The particular design of the present implement not only allows its use on sturdy vines but also on tender vines. Accordingly, the present invention offers the farmer a vine deflecting or turning implement that can be used on a far greater variety of vines than previously possible.

Further, installation of the present invention is expedient because the implement can be mounted on a tractor or other farm vehicle without much trouble. By using the present invention, the farmer is able to traverse fields covered by vines in an efficient manner resulting in cost savings.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a top plan view of the implement illustrated in FIGS. 1 and 2.

FIG. 4 is a perspective view illustrating a device which directly deflects vines on the ground of field rows through which a farm vehicle must pass.

Figure 1:
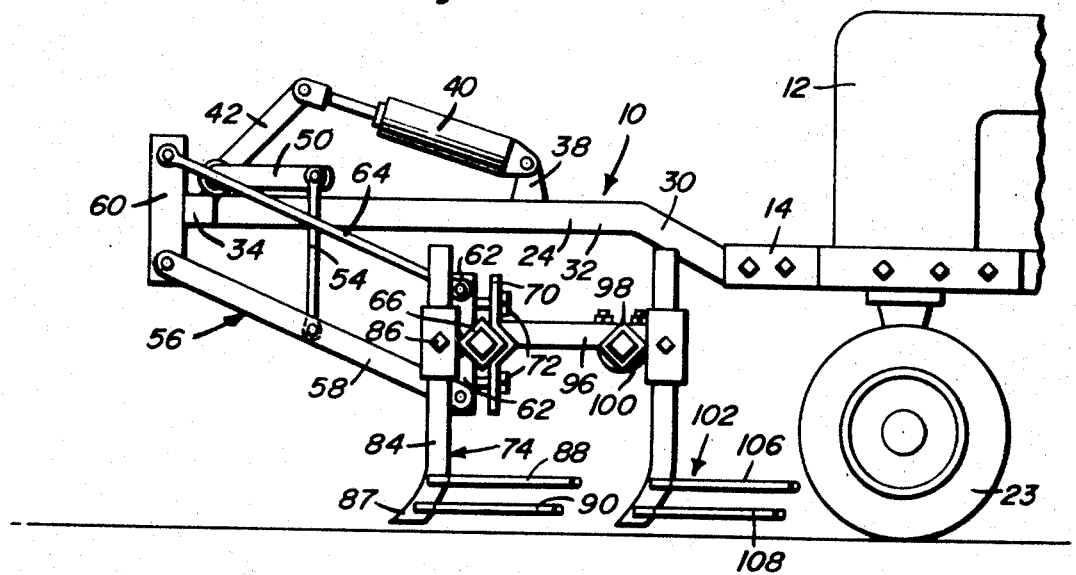
FIG. 1 is a side elevational view illustrating the implement of the present invention.

Referring to the figures and more particularly FIG. 1, reference numeral 10 generally indicates the vine turner or deflector that forms the present invention. The implement is mounted to the forward end of a conventional farm vehicle 12, such as a tractor.

As shown in FIG. 3, connection between the implement and the vehicle is performed by utilizing a U-shaped brace 14 having its bight portion 16 juxtaposed against the forward end 17 of the farm vehicle 12. Oppositely disposed arms 18 and 20 extend forwardly of the bight portion 16 and serve to mount the rear portions 26 of longitudinally disposed and forwardly extending frame sections 22 and 24. Securement between the rearward end portion 26 of the frame sections and the arms 18 and 20 of the U-shaped member is accomplished by means of bolts 28.

As will be noted from FIG. 1, frame sections 22 and 24 (FIG. 3) each includes an angular offset portion 30 forwardly appending to an intermediate horizontal portion 32 that extends forwardly to a cross member 34 that connects the forward outer ends of the two frame sections 22 and 24. The frame sections are disposed in parallel spaced relationship as shown in FIG. 3. FIG. 3 further shows that the frame sections are disposed somewhat laterally outwardly from the sides of the vehicle body but are positioned inwardly from the front wheels 23 of the vehicle. Reference numeral 25 (FIG. 2) denotes the conventional inverted U-shaped axle of the tractor.

As illustrated in FIG. 1, a mounting bracket 36 is positioned between the central portions 32 of frame sections 22 and 24. The rearward clevis end 38 of a hydraulic cylinder 40 is connected to the bracket while a forward clevis end of the cylinder plunger is pivotally connected to a link member 42. FIG. 3 shows the forward end of the latter mentioned link member fixedly connected to a central point 44 along the bight portion of a generally U-shaped crank member 46 journaled in a sleeve 47 that is welded to the cross member 34. As will be appreciated by viewing FIG. 1, the hydraulic cylinder 40 extends forwardly and upwardly at an acute angle with respect to the horizontal while the link member 42 extends upwardly and rearwardly at an acute angle. The arm portions 48 and 50 of the U-shaped member 47 form a bell crank assembly with link 42. The free end of each arm 48, 50 is pivotally attached to a vertically disposed actuator link member 52, 54 respectively. For purposes of convenience, further connections of implement members to the vertically disposed link members 52 and 54 will be discussed relative only to the member 54. It is to be understood by viewing FIGS. 1–3 that a similar symmetrical construction exists relative to vertical link member 52.

Viewing FIG. 1, the lower end of the vertical link member 54 is pivotally connected to an intermediate point on a lower link member 58 that forms part of a parallelogram linkage assembly 56. The link member 54 is an actuator for the assembly 56. The remainder of the linkage assembly includes a vertically disposed bracket 60 pivotally connecting the forward ends of the link member 58 and a second link member 64 positioned in parallel spaced relation to the link member 58. A second vertically disposed bracket 62 connects the opposite ends of the link members 58 and 64 thereby completing the parallelogram linkage assembly 56. In operation of the device, the parallelogram linkage assembly is elevatable and will be displaced upwardly or downwardly in response to commensurate expansion or contraction of the cylinder 40. The control lines (not shown) connected to the cylinder 40 extend rearwardly to the hydraulic system of the vehicle 12, and a conventional control valve (not shown) connected to the control lines allows the operator of the vehicle to chose the proper position of the link assembly 56.

A V-shaped notch 66 (FIG. 1) is formed in the bracket 62 which receives two adjacent edges of a cross-beam 68 (FIG. 3) having a square cross-section and being transversely disposed with respect to vehicle 12. The cross-beam 68 extends laterally beyond the wheels 23 of the vehicle and is secured to the bracket 62 by a V-shaped bracket 70 which engages the other two edges of beam 68. The brackets 62 and 70 are clamped together with a U-shaped bolt 72.

Viewing FIGS. 1 and 3, a first vine deflecting assembly 74 is seen to be positioned on the outward end portion of the beam 68. The assembly 74 includes a square collar that is slidably adjustable on the beam 68. Setscrew 80 in the collar 78 fixes its position relative to the beam. A guide element 82 is integrally connected to the collar 78 and receives the shank portion 84 of a deflecting device 85 that is shown in FIGS. 1 and 4. A setscrew 86 clamps the shank portion in the guide element. The lower end of the shank terminates in a shoe 87 that tends to engage encountered vines and lifts them up off the ground. Two angularly shaped deflecting rods 88 and 90 have offset end portions 89 that are welded to a surface of the shoe portion 87. Deflecting rod 88 is longer than rod 90 and rod 88 is disposed laterally inwardly with respect to rod 90. However, the rods are maintained in parallel spaced relation. By viewing FIG. 3, it will be observed that the rods extend laterally outwardly and rearwardly at an acute angle with respect to the forward travel path.

In the preferred embodiment of the present invention, the assembly 74 is positioned outwardly adjacent the parallelogram linkage assembly 56 while the second deflecting assembly 76 is positioned inwardly adjacent the linkage assembly 56. The deflection assembly 76 includes a collar and guide element similar to 78 and 82, respectively, previously explained in connection with the deflecting assembly 74. However, the deflecting rods 92 and 94 corresponding to the aforementioned deflecting rods 88 and 90, extend laterally inwardly and rearwardly as opposed to laterally outwardly and rearwardly as was the case with the deflecting rods 88 and 90. The angular orientation of the deflecting rods associated with the deflecting assembly 74 and 76 is purposely designed so that the intermediate point between the deflecting assemblies will generally be in vertical alignment with the line along which adjacent rows of vines overlap. Thus, as the vehicle travels forwardly, deflecting rods 88 and 90 will contact vines lifted by the shoe portion 87 of the deflecting device 85 and after so contacting the vines, the deflecting rods will push them laterally out of the travel path. Similarly but oppositely the deflecting rods 92 and 94 will push encountered vines laterally inwardly out of the path of travel. In many instances, it has been found necessary to lower the shoe portion 87 of the deflecting device 85 into burrowing engagement with the ground in order to achieve proper vine lift. Inasmuch as two vine deflecting assemblies 74, 76 push back overlapping vines to their respective sides, these vines need not undergo extensive deflection which would cause their damage in the case of tender vines. Further, the offset parallel relationship between the deflecting rods relating to each assembly increases the deflecting efficiency of the rods.

Figure 2:
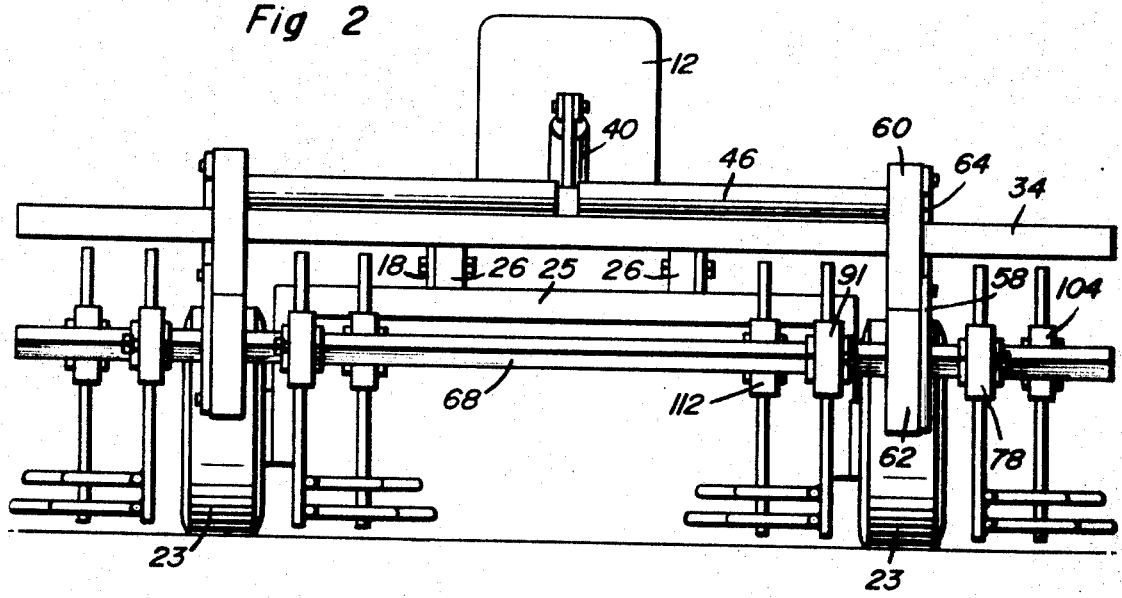
FIG. 2 is a front elevational view of the implement shown in FIG. 1.

As will be appreciated from viewing FIGS. 2 and 3, a symmetrical pair of vine deflecting assemblies can be found at the opposite end portion of cross-beam 68.

As shown in FIG. 1, rearwardly disposed horizontal connecting members 96 support a second cross-beam 98 rearwardly positioned in horizontal alignment with the aforementioned cross-beam 68. A V-shaped slot is formed in the rearward end portion of each connecting member 96, the notches serving to receive the cross-beam 98. U-shaped clamps 100 are used to secure the cross-beam 98 to the connecting members 96. The purpose of the cross-beam 98 is similar to that of beam 68, namely, to support a pair of vine deflecting assemblies on each end portion of the beam. In this respect, a vine deflecting assembly 102 is positioned on cross-beam 98 in laterally outwardly spaced relation to the aforementioned vine deflecting assembly 74. This latter mentioned deflecting assembly includes deflecting rods 106, 108 that are laterally outwardly disposed in parallel spaced relation to the rods 88 and 90 of the vine deflecting assembly 74. When a forwardly positioned vine is encountered by the deflecting rods 88 and 90, the vines are pushed laterally outwardly as the vehicle moves forward. Then, the vines will be contacted by rods 106 and 108 for further laterally outward bending. The free ends of the rods 106 and 108 are well beyond the left tire 23 thereby preventing the vines encountered by these rods from engaging the left tire 23.

An additional vine deflecting assembly 110 is positioned on beam 98 in laterally inwardly spaced relation to the assembly 102. A median point between the assemblies 102 and 110 falls along the centerline that is laterally aligned with the path of travel of the left wheel 23. A collar 112 identical to the previously discussed collars of the aforementioned deflecting assemblies allows adjustment of the deflecting assembly 110 along the length of beam 98. Deflecting rods 114 and 116 are associated with the deflecting assembly 110 and serve the same purpose as discussed in connection with the aforementioned deflecting rods. However, as will be noted, the rods 114 and 116 extend laterally inwardly with respect to rods 92 and 94 of deflecting assembly 76. A symmetrical structure exists at the opposite end of beam 98. Thus, when vines are encountered by rods 94 and 92 they are pushed laterally inwardly. As the vehicle moves forward, the deflected vines are then contacted by the rods 114 and 116 that continue to bend the vines laterally inwardly to allow free passage of the left wheel 23 along the path of the parted vines. Of course, as the vehicle progresses, the vine deflecting assemblies 74 and 76 tend to simultaneously part overlapping vines which are thereafter operated upon simultaneously by the rearwardly aligned deflecting assemblies 102 and 110.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An implement for turning vines out of the path of an approaching vehicle, comprising, in combination:

a. a stationary support frame connected to a vehicle wherein said vehicle has a front end and a forward direction of movement, said frame extending in the forward direction of movement from said front end and including a beam arranged both transversely to the forward direction of movement and forwardly of the front end of the vehicle;

b. an elevatable assembly including a fluid cylinder having a one end pivotally connected to the frame and a second end pivotally connected to a link member which is in turn fixedly connected to a bight portion of a U-shaped crank journaled to the frame for being pivotally moved by the cylinder and having arm portions forming a bell crank with the link, a free end of the arm portions pivotally attached to an actuator link member wherein said actuator link member is pivotally connected to an intermediate point of a first link member of a parallelogram linkage, and second and third link members forming two sides of the parallelogram linkage arranged parallel to one another and connected to the first link member, one of the second and third link members mounted on the frame and the beam mounted on the other for swinging movement therewith; and c. a deflecting assembly mounted on said beam and having first and second deflecting devices, each device including a vertical shank having a lower end which forms a means for engaging a vine and lifting the same, and a deflecting member connected at a one end to the shank adjacent the lower end thereof, the member of said first deflecting device diverging from the member of the second deflecting device and extending toward the front end of the vehicle, each deflecting member separately mounted on said beam and selectively, independently movable therealong laterally of the vehicle for varying the position thereof, wherein there is a spacing between said first and second deflecting devices which forms adjustable means for turning a vine out of a path of an associated wheel of the vehicle.

* * * * *